US011358807B2

(12) United States Patent
Maeda et al.

(10) Patent No.: US 11,358,807 B2
(45) Date of Patent: Jun. 14, 2022

(54) TRANSFER DEVICE AND TRANSFER METHOD

(71) Applicant: Murata Manufacturing Co., Ltd., Kyoto-fu (JP)

(72) Inventors: Kohei Maeda, Nagaokakyo (JP); Yoshikazu Sasaoka, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 17/204,812

(22) Filed: Mar. 17, 2021

(65) Prior Publication Data

US 2021/0300689 A1  Sep. 30, 2021

(30) Foreign Application Priority Data

Mar. 24, 2020 (JP) .............................. JP2020-052964

(51) Int. Cl.
*B65G 47/51* (2006.01)
*B07C 5/344* (2006.01)

(52) U.S. Cl.
CPC .......... *B65G 47/5131* (2013.01); *B07C 5/344* (2013.01); *B65G 47/5127* (2013.01)

(58) Field of Classification Search
CPC .................................................. B65G 47/848
See application file for complete search history.

(56) References Cited

U.S. PATENT DOCUMENTS 8,967,368 B2 * 3/2015 Cheng .................. B65G 47/846
  198/470.1
10,794,951 B2 * 10/2020 Fu ....................... G01R 31/2893

FOREIGN PATENT DOCUMENTS

JP  2002-029627 A  1/2002
JP  2005-350184 A  12/2005

* cited by examiner

*Primary Examiner* — William R Harp
(74) *Attorney, Agent, or Firm* — Studebaker & Brackett PC

(57) ABSTRACT

A transfer device, for transferring components at high speed and inspecting the components, includes a first transfer mechanism including a first transfer section including a first transfer surface that moves along a first transfer path connecting a loading position to a delivery position, and a second transfer mechanism including a second transfer section that moves along a second transfer path connecting a receiving position spaced from the delivery position by a first distance to a discharging position. The second transfer section includes a second transfer surface that continuously rotates about a rotation axis along the second transfer path. A moving direction of the first transfer surface at the delivery position intersects a moving direction of the second transfer surface at the receiving position in a plan view of the first transfer surface. The second transfer mechanism includes a generator that generates an attraction force toward the second transfer surface.

20 Claims, 4 Drawing Sheets

TRANSFER DEVICE AND TRANSFER METHOD

CROSS-REFERENCE TO RELATED APPLICATION

This application claims benefit of priority to Japanese Patent Application No. 2020-052964, filed Mar. 24, 2020, the entire content of which is incorporated herein by reference.

BACKGROUND

Technical Field

The present disclosure relates to a transfer device and a transfer method.

Background Art

Transfer devices to transfer components such as electronic components include one disclosed in JP 2002-29627 A which includes a transfer medium having a plurality of cavities arranged in lines, the lines being concentric to a rotation axis, driving means for rotationally driving the transfer medium, supply means for separating and supplying a plurality of randomly introduced electronic components one by one, delivery means for feeding the electronic components, which are separately supplied by the supply means, into the lines of the cavities of the transfer medium, and removal means for removing the electronic components from the cavities of the transfer medium.

JP 2005-350184 A discloses a supply and separation device including a chute for transferring chip components and a rotating disk for receiving the chip components to be sequentially supplied from the chute, wherein the device includes a stopper that presses and holds a chip component to be supplied next among the chip components waiting to be sequentially supplied from the chute.

SUMMARY

JP 2002-29627 A describes an example in which the transfer device is applied to an inspection device. In the above example, the inspection device includes a turntable as a transfer medium, a parts feeder as a supply means, and a distributing rotor as a separation means. The turntable is mounted so as to rotate about a horizontal rotation axis as the center. The cavities in the respective lines are arranged in line in the radial direction of the turntable. The turntable is intermittently rotated at the pitch equivalent to the pitch of the cavities.

As described above, the transfer device disclosed in JP 2002-29627 A requires intermittent rotation of the turntable. Thus, the structure of the transfer device is unsuitable for supplying components such as electronic components to a continuously rotating body. This makes it difficult to increase the transfer speed of components.

JP 2005-350184 A discloses an example in which the supply and separation device is applied to an appearance inspector. However, since components are transferred in a constant direction, it is difficult to inspect a component surface opposing the moving direction of the component, and it is also difficult to inspect a component surface in contact with a transfer section.

The present disclosure aims to provide a transfer device and a transfer method capable of transferring components at high speed and useful for inspecting the appearance of the components being transferred.

According to a first embodiment, the present disclosure provides a transfer device including a first transfer mechanism including a first transfer section that moves along a first transfer path connecting a loading position to a delivery position; and a second transfer mechanism including a second transfer section that moves along a second transfer path connecting a receiving position spaced from the delivery position of the first transfer section by a first distance D to a discharging position. The first transfer section includes a first transfer surface that moves along the first transfer path. The second transfer section includes a second transfer surface that continuously rotates about a rotation axis along the second transfer path. A moving direction of the first transfer surface at the delivery position intersects a moving direction of the second transfer surface at the receiving position in a plan view of the first transfer surface, and the second transfer mechanism includes an attraction generator that generates an attraction force toward the second transfer surface.

According to a second embodiment, the present disclosure provides a transfer device including a first transfer mechanism including a first transfer section for transferring a component from a loading position to a delivery position, with a first main surface of the component in contact with a first transfer surface of the first transfer section; and a second transfer mechanism including a second transfer section for receiving the component by a second transfer surface of the second transfer section at a receiving position spaced upwardly from the delivery position of the first transfer section and transferring the component to a discharging position. The second transfer surface of the second transfer section continuously rotates about a rotation axis. A transfer direction of the component to the delivery position of the first transfer section intersects a transfer direction of the component from the receiving position of the second transfer section in a plan view of the first transfer surface, and the second transfer mechanism includes an attaching portion for attaching a second main surface opposite the first main surface of the component to the second transfer surface of the second transfer section.

The present disclosure provides a transfer method including a first transfer step of transferring a component from a loading position to a delivery position, with a first main surface of the component in contact with a first transfer surface of a first transfer section; and a second transfer step of receiving the component by a second transfer surface of a second transfer section at a receiving position spaced upwardly from the delivery position of the first transfer section, and transferring the component to a discharging position. The second transfer surface of the second transfer section continuously rotates about a rotation axis. A transfer direction of the component to the delivery position of the first transfer section intersects a transfer direction of the component from the receiving position of the second transfer section in a plan view of the first transfer surface, and the second transfer step transfers the component by attaching a second main surface opposite the first main surface of the component to the second transfer surface of the second transfer section.

The present disclosure enables high-speed transfer of components and is useful for inspecting the appearance of the components being transferred.

DETAILED DESCRIPTION

The transfer device and transfer method of the present disclosure are described below. The present disclosure is not limited to the following preferred embodiments, and may be suitably modified without departing from the gist of the present disclosure. Combinations of two or more preferred features described in the following preferred embodiments are also within the scope of the present disclosure.

The following examples describe embodiments of the transfer device of the present disclosure applied to an appearance inspector for electronic components, with reference to the drawings. Each figure shows a schematic view of the transfer device of the present disclosure. The dimensions, scales, and the like of electronic components (transfer targets) and the transfer device are not accurate.

The transfer device of the present disclosure is applicable to a device other than the appearance inspector. In the transfer device and transfer method of the present disclosure, components to be transferred are not limited to electronic components, and the shape of the components is not limited to a cuboid.

Figure 1:
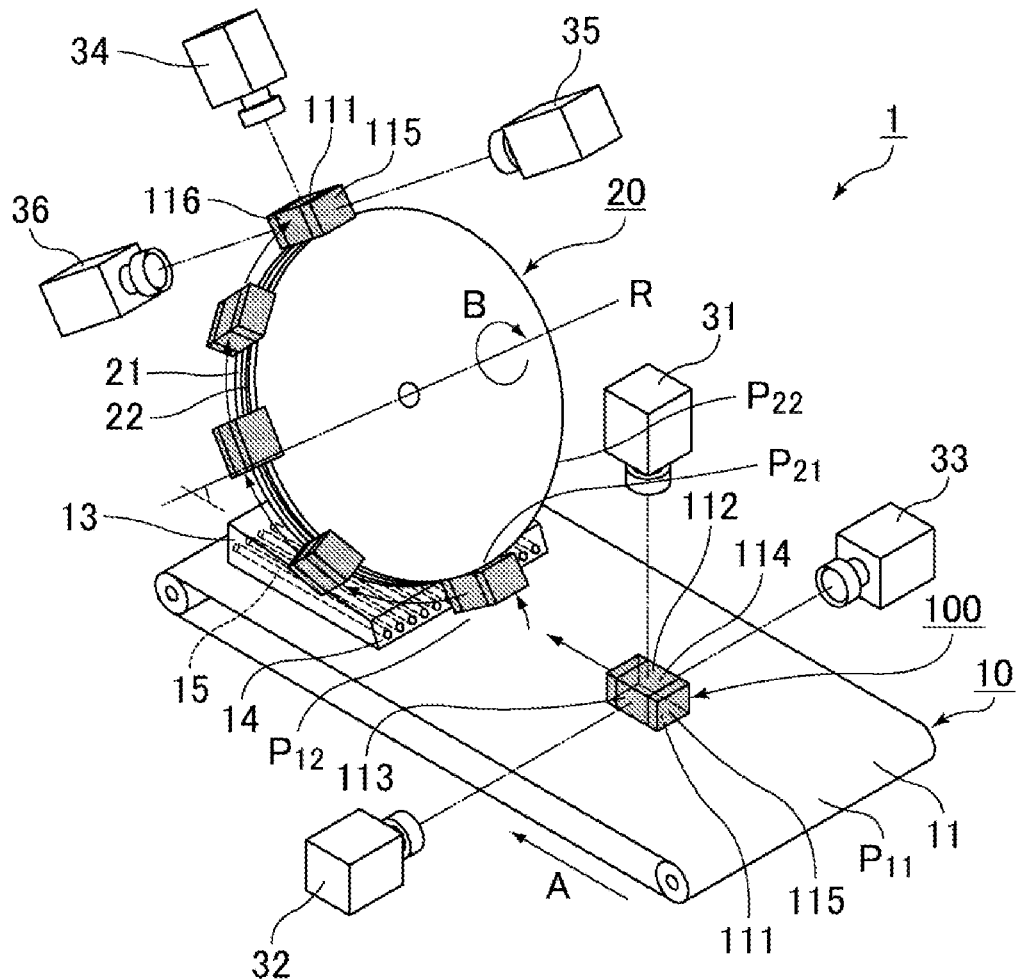
FIG. 1 is a schematic perspective view of an example of a transfer device of the present disclosure applied to an appearance inspector for electronic components.
Figure 2:
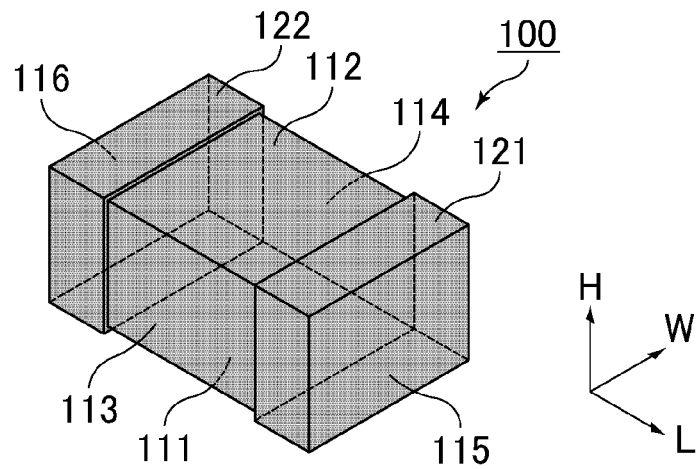
FIG. 2 is a schematic perspective view of an example of an electronic component.

FIG. 1 is a schematic perspective view of an example of the transfer device of the present disclosure applied to an appearance inspector for electronic components. FIG. 2 is a schematic perspective view of an example of an electronic component.

A transfer device 1 shown in FIG. 1 includes a conveyor 10 as a first transfer mechanism and a transfer disk 20 as a second transfer mechanism. Although not shown, the transfer device 1 further includes a parts feeder for supplying a plurality of electronic components 100 to the conveyor 10.

Each electronic component 100 to be transferred by the transfer device 1 is a chip electronic component having a cuboid shape as shown in FIG. 2. The electronic component 100 has a first main surface 111 and a second main surface 112 opposite to each other in a height direction (H direction), a first side surface 113 and a second side surface 114 opposite to each other in a width direction (W direction) orthogonal to the height direction, and a first end surface 115 and a second end surface 116 opposite to each other in a length direction (L direction) orthogonal to the height direction and the width direction. A first external electrode 121 is on the first end surface 115 of the electronic component 100, and a second external electrode 122 is on the second end surface 116 of the electronic component 100. The dimension in each of the length direction, width direction, and height direction of the electronic component 100 is not limited, but preferably, the dimension in the length direction is larger than the dimensions in the width direction and the height direction. Preferably, the dimension in the width direction is comparable to the dimension in the height direction.

The conveyor 10 includes a first transfer section 11 for transferring the electronic component 100. The first transfer section 11 moves along a path (hereinafter, referred to as a "first transfer path") connecting a loading position $P_{11}$ to a delivery position $P_{12}$. Thus, the first transfer section 11 includes a transfer surface (hereinafter, referred to as a "first transfer surface") that moves along the first transfer path. In the example shown in FIG. 1, the first transfer path is a linear trajectory. Specifically, the first transfer surface of the first transfer section 11 moves along the linear trajectory.

The conveyor 10 transfers each electronic component 100 supplied to the loading position $P_{11}$ from the parts feeder to the delivery position $P_{12}$ in a direction indicated by an arrow A, with the first main surface 111 of the electronic component 100 in contact with the first transfer surface of the first transfer section 11. The conveyor 10 may be intermittently driven, but is preferably continuously driven to achieve higher speed. As shown in FIG. 1, preferably, the conveyor 10 transfers the electronic components 100 in such a manner that the length direction of each electronic component 100 is parallel to a transfer direction (i.e., the direction indicated by the arrow A).

The transfer disk 20 includes a second transfer section 21 for receiving the electronic component 100 from the first transfer section 11 and transferring the same. The second transfer section 21 is on the circumference of the transfer disk 20. The second transfer section 21 moves along a path (hereinafter, referred to as a "second transfer path") connecting a receiving position $P_{21}$ to a discharging position $P_{22}$. Thus, the second transfer section 21 includes a transfer surface (hereinafter, referred to as a "second transfer surface") that moves along the second transfer path. The receiving position $P_{21}$ of the second transfer section 21 is spaced upwardly from the delivery position $P_{12}$ of the first transfer section 11, and is spaced from the delivery position $P_{12}$ by a first distance D.

Although not shown, a rotation axis R of the transfer disk 20 is connected to a driving unit such as a motor. Thus, the second transfer surface of the second transfer section 21 continuously rotates about the rotation axis R in a direction indicated by an arrow B.

A moving direction of the first transfer surface at the delivery position $P_{12}$ of the first transfer section 11 intersects a moving direction of the second transfer surface at the receiving position $P_{21}$ of the second transfer section 21 in a plan view of the first transfer surface. In other words, the transfer direction of the electronic components 100 to the delivery position $P_{12}$ of the first transfer section 11 intersects the transfer direction of the electronic components 100 from the receiving position $P_{21}$ of the second transfer section 21 in a plan view of the first transfer surface.

Figure 3:
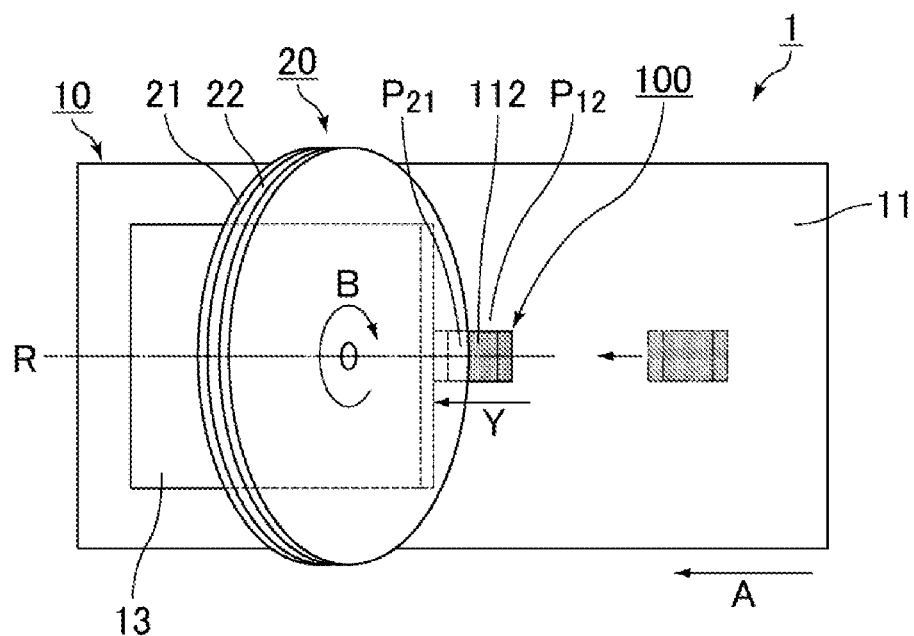
FIG. 3 is a plan view of a conveyor and a transfer disk defining the transfer device shown in FIG. 1.

FIG. 3 is a plan view of a conveyor and a transfer disk defining the transfer device shown in FIG. 1. As shown in FIG. 3, preferably, the rotation axis R of the transfer disk 20 is parallel to the moving direction of the first transfer surface at the delivery position $P_{12}$ of the first transfer section 11 in a plan view of the first transfer surface of the first transfer section 11, that is, the rotation axis R of the transfer disk 20 is parallel to the transfer direction of the electronic component 100 to the delivery position $P_{12}$ of the first transfer section 11 (a direction indicated by an arrow Y in FIG. 3) in a plan view of the first transfer surface of the first transfer section 11.

Herein, while the rotation axis is described as being parallel to the moving direction of the transfer surface or as being parallel to the transfer direction of the component, how parallel it is to these directions is not limited as long as the effects of the present disclosure are achieved. The rotation axis may be completely or substantially parallel to these directions.

Figure 4:
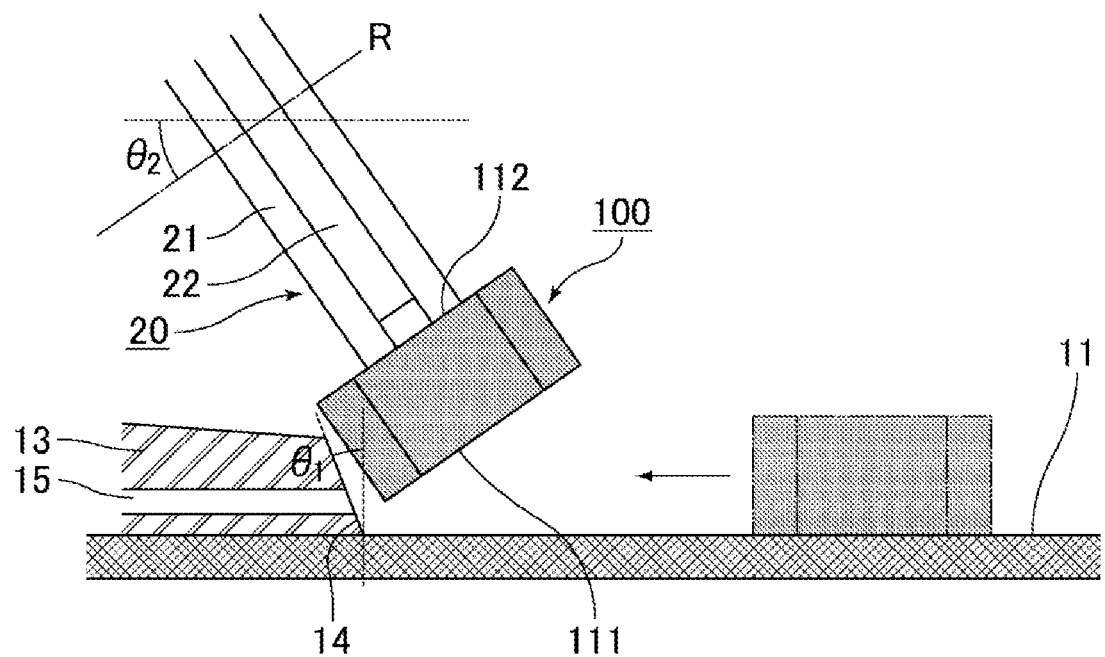
FIG. 4 is an enlarged elevational view of a delivery position in the transfer device shown in FIG. 1.

FIG. 4 is an enlarged elevational view of the delivery position in the transfer device shown in FIG. 1. Preferably, the rotation axis R of the transfer disk 20 is tilted relative to the first transfer surface of the first transfer section 11 as shown in FIG. 4.

The transfer disk 20 includes an attraction generator that generates an attraction force toward the second transfer surface of the second transfer section 21. Preferably, the attraction generator includes a first suction port on the second transfer surface for generating a negative pressure.

For example, the transfer disk 20 includes an attaching portion as the attraction generator for attaching the second main surface 112 of the electronic components 100 to the second transfer surface of the second transfer section 21. In the example shown in FIG. 1, a suction groove 22 as the first suction port is provided along the second transfer section 21 of the transfer disk 20. Instead of the suction groove 22, a plurality of suction ports may be provided along the second transfer section 21. Preferably, the suction is continuously exerted at the second transfer section 21 during transfer. When the electronic component 100 is magnetic, the transfer disk 20 may include an electromagnet as the attraction generator which generates an attraction force that brings the second main surface 112 of the electronic component 100 into contact with the second transfer surface of the second transfer section 21.

The transfer direction of each electronic component 100 can be changed by delivering the electronic component 100 from the conveyor 10 to the transfer disk 20 as described above. In the example shown in FIG. 1, each electronic component 100 is transferred by the conveyor 10 in such a manner that the length direction of the electronic component 100 is parallel to the transfer direction, and is then transferred by the transfer disk 20 in such a manner that the width direction of the electronic component 100 is parallel to the transfer direction.

The transfer device 1 can supply the electronic components 100 to the continuously rotating transfer disk 20, and is thus capable of transferring the electronic components 100 at high speed.

When the transfer device 1 is used as an appearance inspector for the electronic components 100, the transfer device 1 further includes a first imaging mechanism for imaging the electronic components 100 being transferred on the first transfer section 11 and a second imaging mechanism for imaging the electronic components 100 being transferred on the second transfer section 21.

In the example shown in FIG. 1, the first imaging mechanism includes a first imaging device 31 for imaging the second main surface 112 of each electronic component 100, a second imaging device 32 for imaging the first side surface 113 of each electronic component 100, and a third imaging device 33 for imaging the second side surface 114 of each electronic component 100. The second imaging mechanism includes a fourth imaging device 34 for imaging the first main surface 111 of each electronic component 100, a fifth imaging device 35 for imaging the first end surface 115 of each electronic component 100, and a sixth imaging device 36 for imaging the second end surface 116 of each electronic component 100.

Examples of the imaging devices include those equipped with an image sensor such as a charge coupled device (CCD) or a complementary metal oxide semiconductor (CMOS).

When each electronic component 100 is transferred on the first transfer section 11 in a state shown in FIG. 1, it is easy to image the second main surface 112, the first side surface 113, and the second side surface 114 of the electronic component 100. It is difficult, however, to image the first main surface 111 of the electronic component 100 which is in contact with the first transfer section 11, and the first end surface 115 and the second end surface 116 of the electronic component 100 which are opposite to each other in the transfer direction. As described above, the transfer direction of each electronic component 100 can be changed by delivering the electronic component 100 from the conveyor 10 to the transfer disk 20. This makes it easy to image the first main surface 111, the first end surface 115, and the second end surface 116 of the electronic component 100 being transferred on the second transfer section 21. Thus, the appearance of each of the six surfaces of the electronic component 100 can be inspected while the electronic component 100 is being transferred.

As in the example shown in FIG. 1, preferably, the conveyor 10 includes a guide member 13 on the first transfer section 11 for positioning each electronic component 100 to the delivery position $P_{12}$. The guide member 13 includes a positioning surface 14 that intersects the transfer direction of the electronic component 100 to the delivery position $P_{12}$ of the first transfer section 11.

As shown in FIG. 4, preferably, the positioning surface 14 of the guide member 13 is tilted relative to the transfer surface of the first transfer section 11. In a plane parallel to the rotation axis R of the transfer disk 20 and perpendicular to the first transfer surface of the first transfer section 11 as shown in FIG. 4, an angle between the positioning surface 14 of the guide member 13 and a line perpendicular to the first transfer surface of the first transfer section 11 is defined as $\theta_1$. Herein, the angle is preferably $0°<\theta_1<90°$, more preferably $0°<\theta_1 \leq 45°$. When $0°<\theta_1<90°$, the first main surface 111 of the electronic component 100 can be easily separated from the first transfer surface of the first transfer section 11, and the distance between the electronic components 100 and the second transfer surface of the second transfer section 21 can be made shorter. To achieve these two effects, the angle is preferably $0°<\theta_1 \leq 45°$.

In a plane parallel to the rotation axis R of the transfer disk 20 and perpendicular to the first transfer surface of the first transfer section 11 as shown in FIG. 4, an angle between the rotation axis R of the transfer disk 20 and a line parallel to the first transfer surface of the first transfer section 11 is defined as $\theta_2$. When $0°<\theta_1 \leq 45°$ and $\theta_1<\theta_2$, each electronic component 100 can be easily separated from the positioning surface 14 of the guide member 13. The difference between the angle $\theta_2$ and the angle $\theta_1$ is, for example, more than 0° and 15° or less (i.e., from 0° to 15°). Preferably, the angle $\theta_2$ is 5° or more and 45° or less (i.e., from 5° to 45°.

Preferably, the guide member 13 includes an attaching portion for attaching each electronic component 100 to the positioning surface 14. In the example shown in FIG. 1, a plurality of suction paths 15 extends inwardly from the positioning surface 14 of the guide member 13. There may be only one suction path 15. The shape of the suction paths 15 is not limited. Preferably, the suction is continuously exerted at the positioning surface 14 during transfer. Preferably, the angle $\theta_1$ is 5° or more and 30° or less (i.e., from 5° to 30° to allow the electronic component 100 to be stably brought into contact with the positioning surface 14 of the guide member 13 by the suction of the suction paths 15. When the angle $\theta_1$ is equal to or greater than the angle $\theta_2$, the suction of the suction paths 15 can be reduced. This is because when the angle $\theta_1$ is equal to or greater than the angle $\theta_2$, the distance between the electronic components 100 and the suction paths 15 can be further reduced than when the angle $\theta_1$ is smaller than angle $\theta_2$, when the electronic component 100 is tilted on the positioning surface 14 of the guide member 13 by the suction of suction paths 15.

Preferably, the attachment force of the guide member 13 is smaller than the attachment force of the transfer disk 20. Thus, after the electronic component 100 is attached to the positioning surface 14 of the guide member 13, the second main surface 112 of the electronic component 100 can be easily attached to the second transfer surface of the second transfer section 21.

FIG. 5A, FIG. 5B, FIG. 5C, and FIG. 5D are cross-sectional views to describe an example of a method of delivering an electronic component from the conveyor to the transfer disk.

Figure 5A:
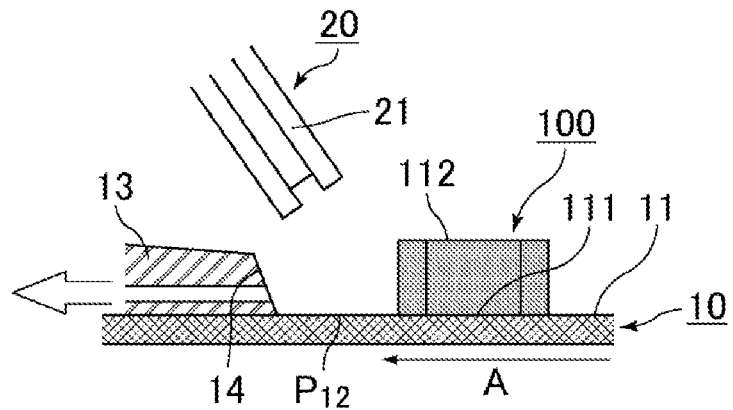
FIG. 5A, FIG. 5B, FIG. 5C, and FIG. 5D are cross-sectional views to describe an example of a method of delivering an electronic component from a conveyor to a transfer disk.

In FIG. 5A, the conveyor 10 transfers the electronic component 100 in a direction indicated by an arrow A. The first main surface 111 of the electronic component 100 is in contact with the first transfer surface of the first transfer section 11. At the guide member 13, the suction is continuously exerted in a direction indicated by a white arrow. At the transfer disk 20, the suction is continuously exerted in a direction toward the rotation axis R (see FIG. 1).

Figure 5B:
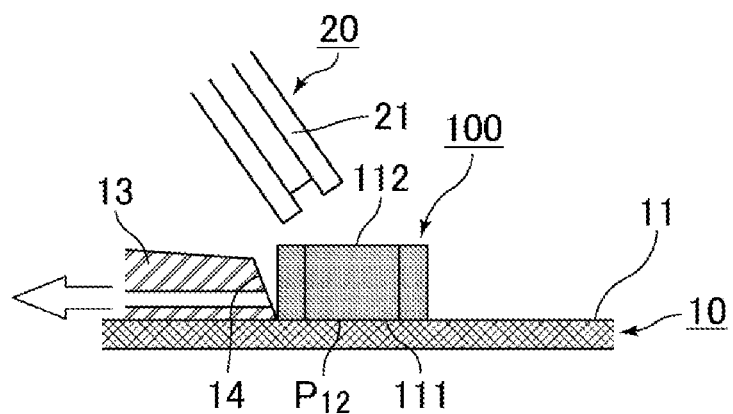

In FIG. 5B, the electronic component 100 that was transferred to the delivery position $P_{12}$ on the first transfer section 11 is abutted on the guide member 13.

Figure 5C:
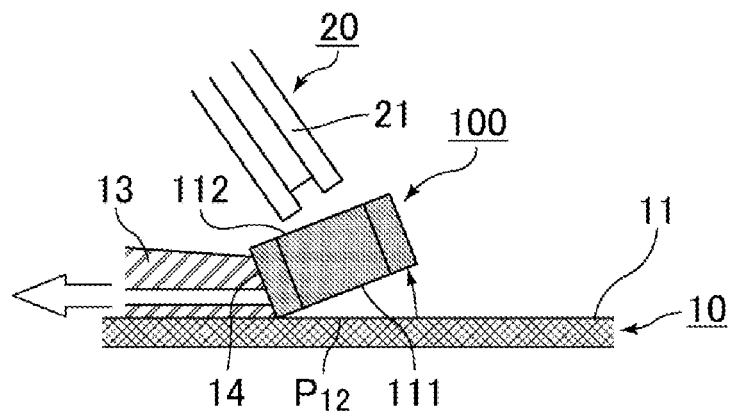
Figure 5D:
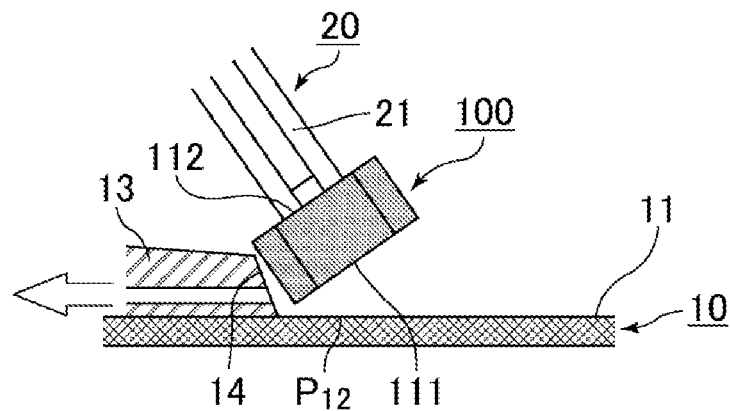

In FIG. 5C, the electronic component 100 is tilted and raised by the suction of the guide member 13. Here, when $0°<\theta_1\leq 45°$, the electronic component 100 is raised at an angle greater than the tilt angle of the positioning surface 14, with the momentum of the rising, as shown in FIG. 5D. As a result, the electronic component 100 approaches the transfer disk 20, whereby the second main surface 112 of the electronic component 100 is attached to the second transfer surface of the second transfer section 21. Here, when the attachment force of the guide member 13 is smaller than the attachment force of the transfer disk 20 and $\theta_1<\theta_2$, the electronic component 100 can be easily separated from the positioning surface 14 of the guide member 13, and the electronic component 100 can be easily attached to the second transfer surface of the second transfer section 21.

Preferably, the conveyor 10 includes an auxiliary power generator, without limitation to the guide member 13 described above, at the delivery position $P_{12}$ for generating a power that acts in a direction from the delivery position $P_{12}$ to the receiving position $P_{21}$.

Preferably, the auxiliary power generator includes the positioning surface 14 with a second suction port that generates a negative pressure. In addition, preferably, the positioning surface 14 is tilted in an extension direction of the first transfer path at the delivery position $P_{12}$. Examples of the second suction port include the suction path 15.

Preferably, the auxiliary power generator and the attraction generator allow the electronic component 100 to be sucked by the first suction port and attached to the second transfer surface when the electronic component 100 approaches the second transfer surface of the second transfer section 21 by being sucked by the second suction port and tilted in contact with the positioning surface 14.

Figure 6:
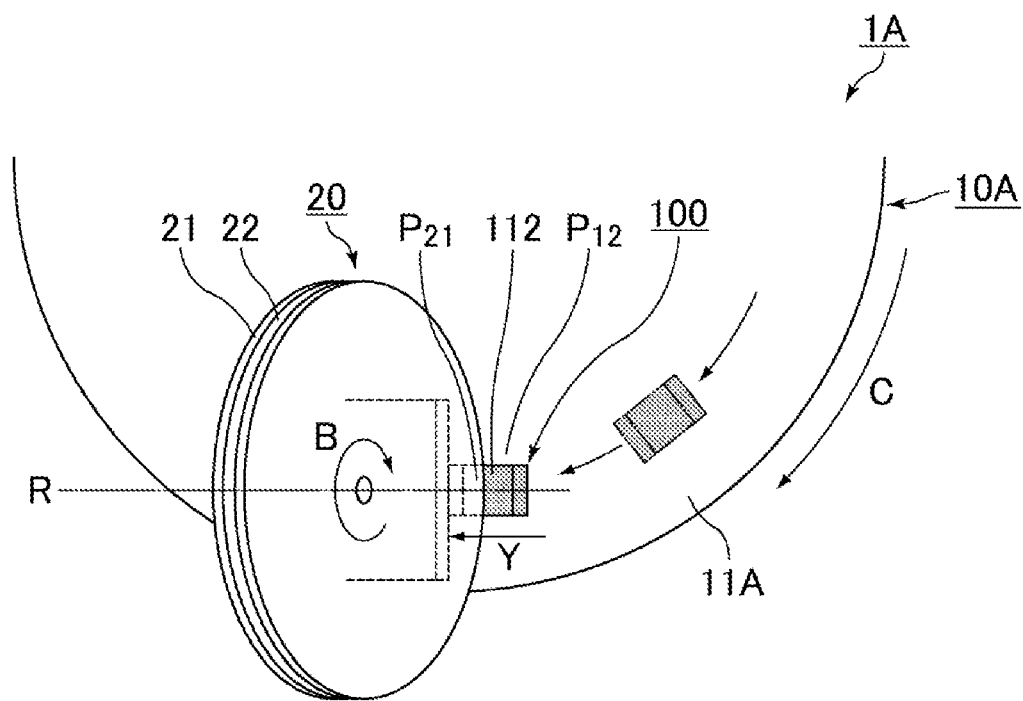
FIG. 6 is a schematic plan view of another example of the transfer device of the present disclosure.

FIG. 6 is a schematic plan view of another example of the transfer device of the present disclosure. A transfer device 1A shown in FIG. 6 includes a transfer disk 10A as a first transfer mechanism and a transfer disk 20 as a second transfer mechanism. Although not shown, the transfer device 1A further includes a parts feeder for supplying a plurality of electronic components 100 to the transfer disk 10A.

The transfer disk 10A includes a first transfer section 11A for transferring the electronic components 100. The first transfer section 11A moves along a first transfer path connecting a loading position (not shown) to a delivery position $P_{12}$. Thus, the first transfer section 11A includes a first transfer surface that moves along the first transfer path. In the example shown in FIG. 6, the first transfer path is a circular trajectory. Specifically, the first transfer surface of the first transfer section 11A moves along the circular trajectory.

Although not shown, the transfer disk 10A is connected to a driving unit such as a motor. Thus, the first transfer surface of the first transfer section 11A rotates in a direction indicated by an arrow C.

The transfer disk 10A transfers each electronic component 100 supplied to the loading position from the parts feeder to the delivery position $P_{12}$ in the direction indicated by the arrow C, with the first main surface of the electronic component 100 in contact with the first transfer surface of the first transfer section 11A. The transfer disk 10A may be intermittently rotated, but is preferably continuously rotated to achieve higher speed. As shown in FIG. 6, preferably, the transfer disk 10A transfers the electronic components 100 in such a manner that a length direction of each electronic component 100 is parallel to a transfer direction (i.e., the direction indicated by the arrow C).

The transfer disk 20 includes a second transfer section 21 for receiving the electronic components 100 from the first transfer section 11A and transferring the same. The second transfer section 21 is on the circumference of the transfer disk 20. The second transfer section 21 moves along a second transfer path connecting a receiving position $P_{21}$ to a discharging position (not shown). Thus, the second transfer section 21 includes a second transfer surface that moves along the second transfer path. The receiving position $P_{21}$ of the second transfer section 21 is spaced upwardly from the delivery position $P_{12}$ of the first transfer section 11A, and is spaced from the delivery position $P_{12}$ by a first distance D.

Although not shown, a rotation axis R of the transfer disk 20 is connected to a driving unit such as a motor. Thus, the second transfer surface of the second transfer section 21 continuously rotates about the rotation axis R in a direction indicated by an arrow B.

A moving direction of the first transfer surface at the delivery position $P_{12}$ of the first transfer section 11A intersects a moving direction of the second transfer surface at the receiving position $P_{21}$ of the second transfer section 21 in a plan view of the first transfer surface. In other words, the transfer direction of the electronic components 100 to the delivery position $P_{12}$ of the first transfer section 11A intersects the transfer direction of the electronic components 100 from the receiving position $P_{21}$ of the second transfer section 21 in a plan view of the first transfer surface.

As shown in FIG. 6, preferably, the rotation axis R of the transfer disk 20 is parallel to the moving direction of the first transfer surface at the delivery position $P_{12}$ of the first transfer section 11A in a plan view of the first transfer surface of the first transfer section 11A, that is, the rotation axis R of the transfer disk 20 is parallel to the transfer direction of the electronic components 100 to the delivery position $P_{12}$ of the first transfer section 11A (a direction indicated by an arrow Y in FIG. 6) in a plan view of the first transfer surface of the first transfer section 11A.

The transfer device 1A shown in FIG. 6 has a structure similar to that of the transfer device 1 shown in FIG. 1, except that the first transfer mechanism is the transfer disk 10A. Thus, the transfer disk 20 defining the transfer device 1A has a structure similar to that of the transfer disk 20 defining the transfer device 1.

In the transfer device 1A shown in FIG. 6, the transfer direction of each electronic component 100 can be changed by delivering the electronic component 100 from the transfer disk 10A to the transfer disk 20, as in the transfer device 1 shown in FIG. 1.

Preferably, the transfer disk 10A includes a guide member on the first transfer section 11A for positioning each electronic component 100 to the delivery position $P_{12}$. A preferred structure of the guide member is similar to that of the transfer device 1 shown in FIG. 1.

Preferably, the transfer 10A includes an auxiliary power generator, without limitation to the guide member described above, at the delivery position $P_{12}$ for generating a power that acts in a direction from the delivery position $P_{12}$ to the receiving position $P_{21}$. A preferred structure of the auxiliary power generator is similar to that of the transfer device 1 shown in FIG. 1.

The present disclosure is not limited to the above preferred embodiments. Various applications and modifications can be added to the structure of the transfer device, component structures, method of transferring components, and the like, without departing from the gist of the present.

The conveyor 10 as the first transfer mechanism shown in FIG. 1 and the transfer disk 10A as the first transfer mechanism shown in FIG. 6 transfer the electronic components 100 in such a manner that the length direction of each electronic component 100 is parallel to the transfer direction, but may transfer the electronic components 100 in such a manner that a width direction of each electronic component 100 is parallel to the transfer direction.

When the first transfer mechanism includes the guide member, the positioning surface of the guide member may not be tilted relative to the transfer surface of the first transfer section. The first transfer mechanism such as the conveyor or the transfer disk may not include the guide member.

The rotation axis of the second transfer mechanism may be parallel to the transfer surface of the first transfer section.

What is claimed is:
1. A transfer device comprising:
a first transfer mechanism including a first transfer section comprising a first transfer surface configured to move along a first transfer path connecting a loading position to a delivery position; and
a second transfer mechanism including a second transfer section configured to move along a second transfer path connecting a receiving position spaced from the delivery position of the first transfer section by a first distance D to a discharging position, the second transfer section comprising a second transfer surface that is configured to continuously rotate about a rotation axis along the second transfer path, and the second transfer mechanism comprising an attraction generator configured to generate an attraction force toward the second transfer surface, a moving direction of the first transfer surface at the delivery position intersecting a moving direction of the second transfer surface at the receiving position in a plan view of the first transfer surface.
2. The transfer device according to claim 1, wherein the attraction generator comprises a first suction port on the second transfer surface configured to generate a negative pressure.

3. The transfer device according to claim 1, wherein the first transfer mechanism comprises an auxiliary power generator at the delivery position configured to generate a power that acts in a direction from the delivery position to the receiving position.
4. The transfer device according to claim 3, wherein the auxiliary power generator comprises a positioning surface with a second suction port configured to generate a negative pressure, the positioning surface being tilted in an extension direction of the first transfer path at the delivery position.
5. The transfer device according to claim 4, wherein the attraction generator comprises a first suction port on the second transfer surface configured to generate a negative pressure, and
the auxiliary power generator and the attraction generator are configured to allow a transfer target to be sucked by the first suction port and attached to the second transfer surface when the transfer target approaches the second transfer surface by being sucked by the second suction port and tilted in contact with the positioning surface.
6. The transfer device according to claim 1, wherein the first transfer path is a linear or circular trajectory.
7. A transfer device comprising:
a first transfer mechanism including a first transfer section configured to transfer a component from a loading position to a delivery position, with a first main surface of the component in contact with a first transfer surface of the first transfer section; and
a second transfer mechanism including a second transfer section configured to receive the component by a second transfer surface of the second transfer section at a receiving position spaced upwardly from the delivery position of the first transfer section, and transfer the component to a discharging position, the second transfer surface of the second transfer section being configured to continuously rotate about a rotation axis, a transfer direction of the component to the delivery position of the first transfer section intersecting a transfer direction of the component from the receiving position of the second transfer section in a plan view of the first transfer surface, and the second transfer mechanism comprising an attaching portion configured to attach a second main surface opposite the first main surface of the component to the second transfer surface of the second transfer section.
8. The transfer device according to claim 7, wherein the first transfer mechanism comprises a guide member on the first transfer section configured to position the component to the delivery position, and
the guide member comprises a positioning surface configured to intersect the transfer direction of the component to the delivery position of the first transfer section.
9. The transfer device according to claim 8, wherein in a plane parallel to the rotation axis of the second transfer mechanism and pendicular to the first transfer surface of the first transfer section, the following expression is satisfied: $0°<\theta_1\leq45°$, where $\theta_1$ is an angle between the positioning surface of the guide member and a line perpendicular to the first transfer surface of the first transfer section.
10. The transfer device according to claim 9, wherein in a plane parallel to the rotation axis of the second transfer mechanism and perpendicular to the first transfer surface of the first transfer section, the following expression is satisfied: $\theta_1<\theta_2$, where $\theta_2$ is an angle between the rotation axis of the second transfer mechanism and a line parallel to the first transfer surface of the first transfer section.

11. The transfer device according to claim 8, wherein the guide member comprises an attaching portion configured to attach the component to the positioning surface.

12. The transfer device according to claim 11, wherein the guide member has a smaller attachment force than the second transfer mechanism.

13. The transfer device according to claim 7, wherein the first transfer surface of the first transfer section is configured to move along a linear or circular trajectory.

14. The transfer device according to claim 7, wherein the component has a cuboid shape having the first main surface, the second main surface, a first side surface and a second side surface opposite to each other in a width direction orthogonal to a height direction in which the first main surface and the second main surface are opposite to each other, and a first end surface and a second end surface opposite to each other in a length direction orthogonal to the height direction and the width direction, the first transfer mechanism is configured to transfer the component such that one of the length direction or the width direction of the component is parallel to the transfer direction, and the second transfer mechanism is configured to transfer the component such that the other of the length direction or the width direction of the component is parallel to the transfer direction.

15. The transfer device according to claim 7, further comprising:

a first imaging mechanism configured to image the component being transferred on the first transfer section, and a second imaging mechanism configured image the component being transferred on the second transfer section.

16. The transfer device according to claim 15, wherein the component has a cuboid shape having the first main surface, the second main surface, a first side surface and a second side surface opposite to each other in a width direction orthogonal to a height direction in which the first main surface and the second main surface are opposite to each other, and a first end surface and a second end surface opposite to each other in a length direction orthogonal to the height direction and the width direction, the first transfer mechanism is configured to transfer the component such that one of the length direction or the width direction of the component is parallel to the transfer direction, the second transfer mechanism is configured to transfer the component such that the other of the length direction or the width direction of the component is parallel to the transfer direction, the first imaging mechanism comprises a first imaging device configured to image the second main surface of the component, a second imaging device configured to image the first side surface of the component, and a third imaging device configured to image the second side surface of the component, and the second imaging mechanism comprises a fourth imaging device configured to image the first main surface of the component, a fifth imaging device configured to image the first end surface of the component, and a sixth imaging device configured to image the second end surface of the component.

17. A transfer method comprising:

transferring a component from a loading position to a delivery position, with a first main surface of the component in contact with a first transfer surface of a first transfer section; and receiving the component by a second transfer surface of a second transfer section at a receiving position spaced upwardly from the delivery position of the first transfer section, and transferring the component to a discharging position, the second transfer surface of the second transfer section continuously rotating about a rotation axis, and further transferring the component by attaching a second main surface opposite the first main surface of the component to the second transfer surface of the second transfer section, wherein a transfer direction of the component to the delivery position of the first transfer section intersects a transfer direction of the component from the receiving position of the second transfer section in a plan view of the first transfer surface.

18. The transfer method according to claim 17, wherein a guide member having a positioning surface is disposed at the delivery position of the first transfer section, and the transferring abuts the component to the positioning surface.

19. The transfer method according to claim 18, the transferring attaches the component to the positioning surface.

20. The transfer method according to claim 18, wherein the transferring abuts the component to the positioning surface to tilt the component so that the component approaches the second transfer surface, and the further transferring attaches the component approaching the second transfer surface to the second transfer surface.

* * * * *